(12) United States Patent
Joy et al.

(10) Patent No.: US 8,489,695 B2
(45) Date of Patent: Jul. 16, 2013

(54) PROXY COMMUNICATIONS ON A SOCIAL NETWORK

(75) Inventors: George Joy, Kirkland, WA (US); Nalin Kumar, Redmond, WA (US); Ravikant Cherukuri, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 13/043,469

(22) Filed: Mar. 9, 2011

(65) Prior Publication Data
US 2012/0233265 A1 Sep. 13, 2012

(51) Int. Cl.
*G06F 15/16* (2006.01)

(52) U.S. Cl.
USPC ........... 709/206; 709/202; 709/205; 709/207; 709/218; 709/227; 709/249

(58) Field of Classification Search
USPC ................. 709/202, 204, 218, 227, 249, 205, 709/206, 207
See application file for complete search history.

(56) References Cited

U.S. PATENT DOCUMENTS

| | | | |
|---|---|---|---|
| 7,353,295 B1 * | 4/2008 | Crow et al. | 709/245 |
| 8,001,612 B1 * | 8/2011 | Wieder | 726/28 |
| 8,112,713 B2 * | 2/2012 | Zuber | 715/738 |
| 2005/0216550 A1 | 9/2005 | Paseman et al. | |
| 2007/0150603 A1 | 6/2007 | Crull et al. | |
| 2009/0030985 A1 * | 1/2009 | Yuan | 709/204 |
| 2010/0077045 A1 | 3/2010 | Bercu et al. | |
| 2010/0114788 A1 | 5/2010 | White et al. | |
| 2010/0274815 A1 * | 10/2010 | Vanasco | 707/798 |
| 2011/0196922 A1 * | 8/2011 | Marcucci et al. | 709/204 |
| 2012/0233265 A1 * | 9/2012 | Joy et al. | 709/206 |
| 2012/0259931 A1 * | 10/2012 | Prokopi et al. | 709/206 |

OTHER PUBLICATIONS

"Integrating Twitter, Facebook, Linkedin, Myspace", Retrieved at<<http://www.socialmediamarketing.co.in/integrating-twitter-facebook-linkedin-myspace.html>>, Jul. 5, 2010, p. 1.
Blowers, Brendan, "Maximize social reach—save time by integrating social networks",Retrieved at<<http://ezinearticles.com/?Maximize-Social-Reach—Save-Time-by-Integrating-Social-Networks&id=4109769>>, Apr. 14, 2010, pp. 4.
Lowensohn, Josh, "Whrrl's geo-social network comes to the iPhone",Retrieved at<<http://news.cnet.com/8301-17939_109-10195947-2.html>>, Mar. 13, 2009, pp. 5.
Gibbs, Mark, "Social networking integration", Retrieved at<<http://www.networkworld.com/newsletters/web/2007/1105web2.html>>, Nov. 7, 2007, pp. 2.

* cited by examiner

*Primary Examiner* — Michael Y Won
(74) *Attorney, Agent, or Firm* — International IP Law Group, PLLC

(57) ABSTRACT

The claimed subject matter provides a system and/or method for establishing proxy communications between users on a social network. An exemplary method includes creating an alias on a primary social network when a user logs in to the primary social network, wherein the alias comprises the user's identity on a secondary social network. The method further includes creating a cache comprising a map relating a second user's identity on the primary social network to the second user's identity on a secondary social network, wherein the creation of the map is based, at least in part, on the user and the second user being identified as friends in the secondary social network. Communications from the user to the second user are directed through the primary social network based, at least in part, on the map. The communications are formatted to appear as if they were sent from the user's account on the secondary social network.

20 Claims, 5 Drawing Sheets

200

400

PROXY COMMUNICATIONS ON A SOCIAL NETWORK

BACKGROUND

Social networks often allow advanced communications between users, including, for example, the posting of pictures and video to a user's page, presence information, instant messaging, video communications, and the like. Further, the social network may allow a user on another social network to perform certain functions, such as communicating with friends on the first social network. However, the externally accessible functionality may be limited to functions and uses that the social networks have in common, such as presence detection and instant messaging. This may limit advanced communications between users.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

The subject innovation relates to methods and systems for establishing proxy communications between two users on a primary social network based on their identification as friends, on a secondary social network. The proxy communication takes place directly between accounts in the primary social network, using cached maps to identify the primary social network account that corresponds to a user's account on the secondary social network. Each message sent between the accounts on the primary social network is modified to appear as if it came from a sender's corresponding account on the secondary social network. As a result, more complex communications, including audio files, video files, picture files, and the like, may be sent between the accounts than may be allowed by communication connections between the primary social network and the secondary social network.

An exemplary method can be used to establish proxy communications between users on a social network. The method includes creating an alias on a primary social network when a user logs in to the primary social network, wherein the alias includes the user's identity on a secondary social network. A cache can be created that includes a map relating a second user's identity on the primary social network to the second user's identity on a secondary social network, wherein the creation of the map is based, at least in part, on the user and the second user being identified as friends in the secondary social network. Communications from the user to the second user can be directed through the primary social network based, at least in part, on the map, wherein the communications appear to have been sent from a sender's account on the secondary social network.

An exemplary system provides for establishing proxy communications between users on a primary social network. The system includes a processing unit in the primary social network and a system memory, wherein the system memory includes code configured to direct the processing unit to create an alias for a user on a primary social network when the user logs in to the primary social network, and wherein the alias includes the user's identity on a secondary social network. The code can direct the processor to create a cache configured to hold maps that relate other users' identities on the primary social network to their corresponding identities on a secondary social network, wherein the other users are friends of the user in the secondary social network. Communications can be directed between the user and the other users through the primary social network based, at least in part, on the maps, wherein the communications are configured to appear to have been sent from the secondary social network.

Another exemplary embodiment of the subject innovation provides one or more computer-readable storage media that include code configured to direct a processing unit to create an alias on a primary social network when a user logs in to the primary social network, and wherein the alias comprises the user's identity on a secondary social network. The code can be configured to direct the processor to create a cache including a map relating a second user's identity on the primary social network to the second user's identity on a secondary social network, wherein the creation of the map is based, at least in part, on the user and the second user being identified as friends in the secondary social network. The code can be configured to direct the processor to direct communications from the user to the second user through the primary social network based, at least in part, on the map, wherein the communications appear to have been sent from the user's account on the secondary social network.

The following description and the annexed drawings set forth in detail certain illustrative aspects of the claimed subject matter. These aspects are indicative, however, of but a few of the various ways in which the principles of the innovation may be employed, and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
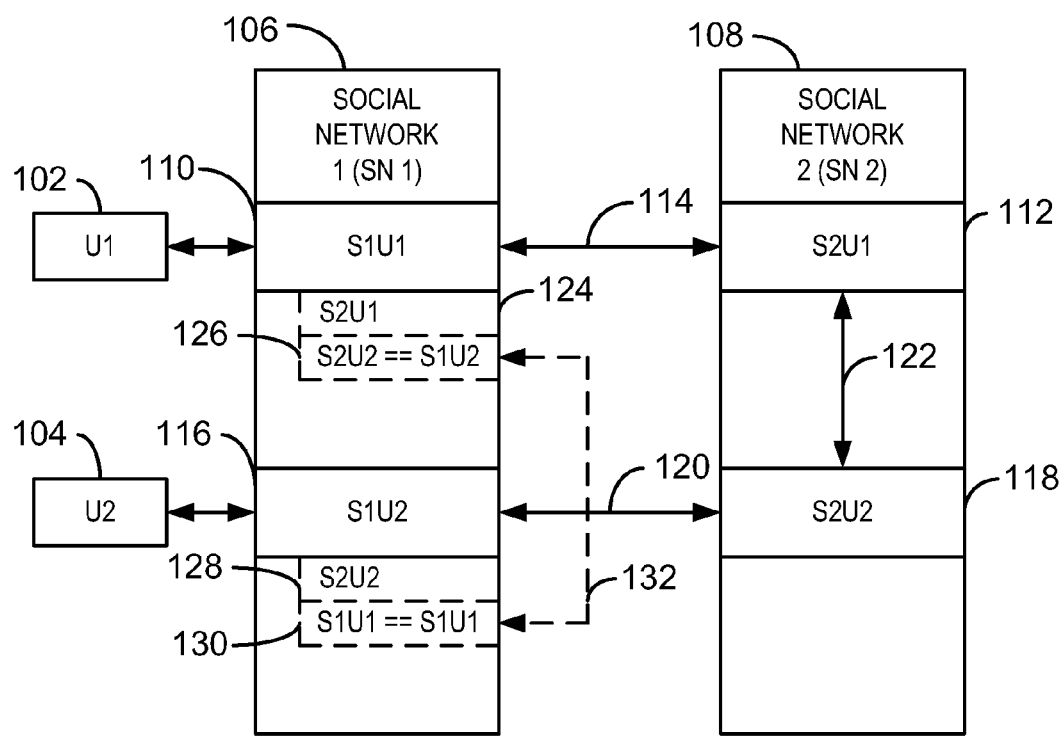
FIG. 1 is a block diagram that is useful in explaining proxy communications between two users on a first social networking site according to the subject innovation.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media, such as a computer-readable storage media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for electrical or electronic signals and the like.

Those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The subject innovation relates to establishing proxy communications between two users on a primary social network based on their status, such as a friendship designation, on a secondary social network. Although two users and two social networks are used to simplify the explanation herein, it will be clear that the techniques described herein are not limited to two users or two social networks, but may be expanded to any number of users and social networks. As used herein, a social network is a system that facilitates communications between user accounts, wherein the communications are along links created by accepting requests, e.g., friendship requests, between users. The social networks described herein include all associated websites and hardware, software, locations, mirror sites, and the like. Each user has an identity, or id, on each social network, which may include the name of the social network and the account name under which the user accesses the social network.

The proxy communications can be performed by modules associated with each of the user accounts in the primary social network that create proxy entities, termed "aliases," in the primary social network for the corresponding identities in the secondary social network. The aliases are created when a user having multiple linked identities on various social networks logs into the primary social network. The alias may be queried for a primary network identification. In response, the mapping of the caller's identity in the secondary social network to the caller's identity in the primary social network is recorded and a corresponding mapping is returned. Thus, both parties can build a temporary map of currently present (logged on) users correlating their secondary social network identities to their primary network identity.

The maps can be used for proxy communications, such as message translation and routing, without having to route messages through the secondary social network. Accordingly, as routing messages through a secondary network may limit the complexity of the communications, the proxy communications may allow more advanced technologies to be used for communications between the users, such as allowing video files to be sent between the users. Further, since the mapping is dynamically constructed and deleted upon logging off the primary social network, persistent maps of the identities on the primary social network to the corresponding identities on the secondary social network may not be retained. Thus, communication channels are established in a scalable manner.

FIG. 1 is a block diagram 100 that is useful in explaining the proxy communications between two users 102 and 104 on a primary social network 106 according to the subject innovation. In the diagram 100, both users have accounts on the primary social network 106 and a secondary social network 108. The first user, U1 102, has an account on the primary social network 106, S1U1 110, which may be linked to the user's account on the secondary social network 108, S2U1 112, by an automated link 114 set up by the user U1 102. Similarly, the second user U2 104 has an account on the primary social network 106, S1U2 116, which may be linked to the user's account on the secondary social network 108, S2U2 118, by an automated link 120 set up by the user U2 104.

A communications link 122 may be set up between accounts S2U1 112 and S2U2 118 on the secondary social network 108, for example, by sending an invitation from S2U2 118 to S2U1 112. If the user of S2U1 112 accepts the invitation, the two accounts S2U1 112 and S2U2 118 may then communicate with each other over the secondary social network 108. Further, if each user 102 and 104 is logged in to the primary social network 106, they can communication with each other over the secondary social network 108 through the links 114 and 120 to their respective accounts 112 and 118 on the secondary social network 108, using the communications link 122. The communications appear to a user 102 or 104 to have originated from the respective senders account on the secondary social network 108. However, the communications may be limited by the application programming interface (API) used to establish the links 114 and 120, which may limit the complexity of the communications between the users 102 and 104.

In an exemplary embodiment, a module creates an alias 124 on the primary social network 106 corresponding to a user's account S2U1 112 on the secondary social network 108. A cache 126 is also created on the primary social network 106, which can hold a map of the corresponding identities on the primary social network 106 and the secondary social network 108 for another user, such as the map phrase "S2U2═S1U2," shown in the diagram 100. Similarly, another alias 128 can be created for a second user's account S1U2 116 on the primary social network 106, corresponding to the second user's identity, "S2U2," on the secondary social network 108. As for S1U1 110, a cache 130 can be created for the second user's account, S1U2 116, that holds a map of a first user's corresponding identities on the primary social network 106 and the secondary social network 108, such as the map phrase "S2U1 ═S1U1," shown in the diagram 100.

The maps 126 and 130 can then be used to establish a proxy communication link 132 between the user accounts S1U1 and S1U2 on the primary social network 106. This link may then be used to send communications between the user accounts 110 and 116 that appear to have originated from the sending user's account on the secondary social network 108. Further, the communications technologies on the proxy communication link 132 may not be as limited as over the links 114 and 120 to the secondary social network 108, allowing more complex communications to take place. The methods for setting up the proxy communication link are discussed in greater detail with respect to FIGS. 2 and 3.

Figure 2:
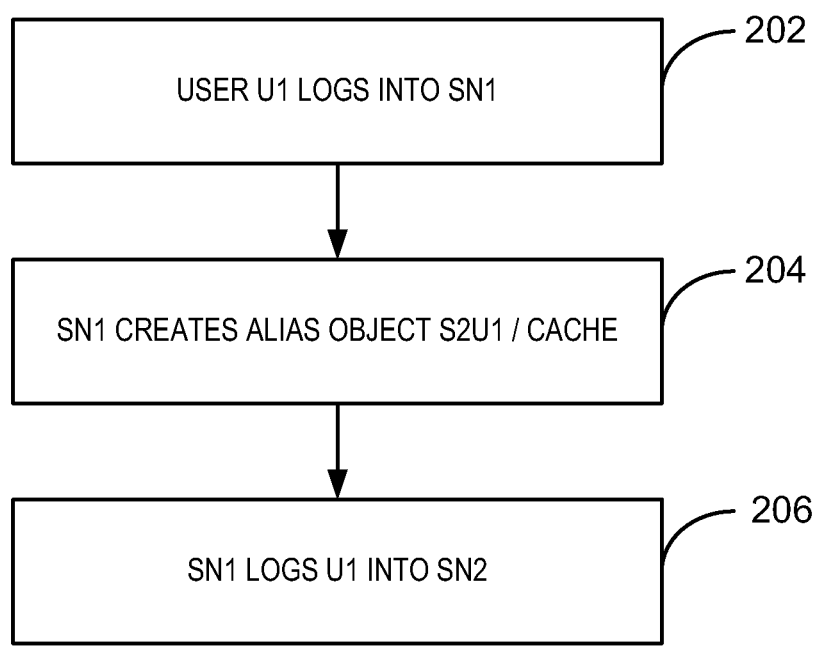
FIG. 2 is a process flow diagram of a method for establishing an alias for a first user when the first user signs in to a social networking site according to the subject innovation.

FIG. 2 is a process flow diagram of a method 200 for establishing an alias for a first user when the first user signs in to a social networking site according to the subject innovation. The method 200 begins at block 202 when a user logs into a primary social network, for example, as S1U1. At block 204, a module in the primary social network can create an alias containing the user's identity on a secondary social network, such as S2U1. The module also creates a cache for storing maps relating other user's identities on the secondary social network to corresponding identities on the primary social network. At block 206, the primary social network then logs the user into the account on the secondary social network, allowing communications with persons signed on to the secondary social network.

Figure 3:
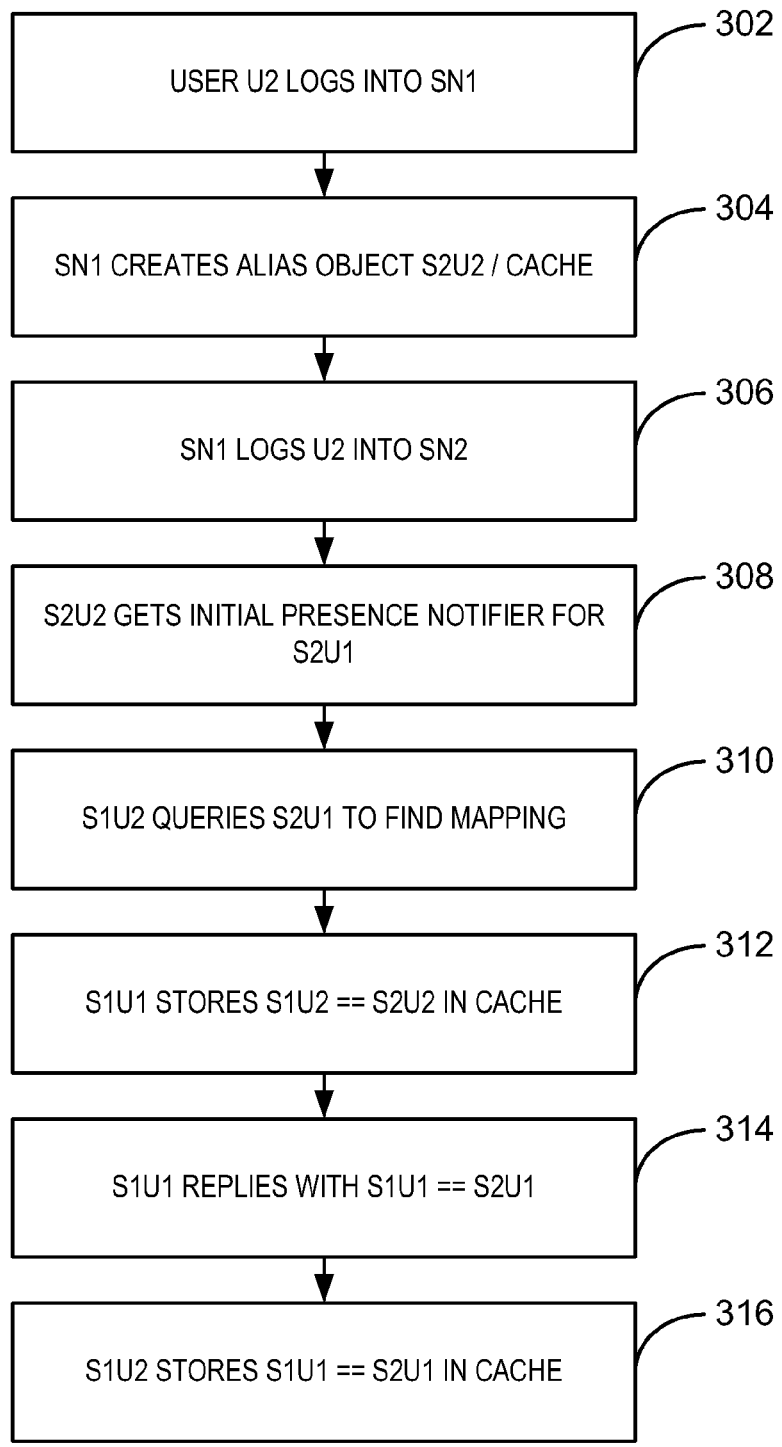
FIG. 3 is a process flow diagram of a method for establishing an alias for a second user and initiating proxy communications with the first user according to the subject innovation.

FIG. 3 is a process flow diagram of a method 300 for establishing a proxy for a second user and initiating proxy communications with the first user according to the subject innovation. The method 300 begins at block 302 when an additional user, for example, U2, logs on the primary social network. At block 304, a module in the primary social network creates an alias for the additional user's account on a secondary social network and populates the alias with the identity from the secondary social network, such as S2U2. The module also creates a cache for holding maps relating other user's primary social network identities to their secondary social network identities. At block 306, the primary social network logs the user into the secondary social network.

At block 308, the secondary social network account, S2U2 receives an initial presence notifier for linked users who are already logged on to their accounts on the secondary social network. For example, the notifiers may include a notification that the first user, U1, is logged on to S2U1. The notifications are passed on to the user's account, S1U2, on the primary social network, for example, through link 120 discussed with respect to FIG. 1.

In addition to displaying the notifications for the user, U2, at block 310, an alias module in the primary social network 106 may query for each of the linked accounts (friends) to determine if any of the linked accounts have an alias on the primary social network 106. For example, referring also to FIG. 1, account S1U2 116 on the primary social network 106 can query in the primary social network 106 to determine if the alias S2U1 124 exists. If the alias exists, at block 312, the alias S2U1 124 forwards the query information to S1U1 110 so that the cache 126 can be updated with the information S 1U2 ==S2U2.

At block 314, the alias S2U1 124 replies with S1U1==S2U1. If the alias does not exist, no value is returned to S1U2 116 and, hence, S1U2 116 knows that there is no alias for the account S2U1 112 on the secondary social network 108.

If the alias S2U1 110 replies with S1U1==S2U1, at block 316, S1U2 116 stores the mapping information S1U2==S2U2 in the corresponding cache 130. Once the caches 126 and 130 have stored the mapped relationships between the users' accounts on the primary and secondary social networks, they may be used to facilitate direct communication between the users' accounts on the primary social network, as discussed with respect to FIG. 1. For example, the proxy may compare outgoing messages to the maps stored in the cache, and, if a corresponding account exists on the primary social network, the message may be sent directly to that account. The "from" entry can be modified to show the account name of the corresponding account on the secondary network, thus, making the mapping invisible to the users.

In an embodiment, a similar approach may be used to create alias objects for users upon logging in to the primary social network, but wherein the details for routing notifications and signals can be stored in a distributed cache for fetching by modules on the primary social network. However, this may lead to a high volume of network calls. In an embodiment, a full list of maps of secondary social network identities to primary social network details of a user's friends in the secondary social network may be stored on the primary social network. However, this can lead to wasted storage space as much of the time friends in the secondary social network may not be available for communication. It also requires the primary network to have a permanent store of details of friends in secondary social networks and their mapping to the corresponding primary social network id.

In the example that follows, the primary social network is Windows Live™ and the secondary social network is Facebook©. However, the techniques described herein are not limited to these networks, or, indeed, to only two networks. Social networks that may be used in exemplary embodiments include, for example, Windows Live™, Facebook©, MySpace©, and many others.

Windows Live™ messenger provides its users the ability to communicate with their Facebook© friends over links to the Facebook© system, for example, as described with respect to links 114 and 120 in FIG. 1. This applies to two users who are friends only in Facebook© and are using Windows Live™ messenger for connecting to Facebook©. Currently, the only supported functionality is basic instant messaging (IM) and presence, because that is the only functionality that Facebook© supports for parties accessing their account through external social networks. When both users make their connection to Facebook© via the Windows Live™ services, the techniques described herein may be used to support richer communications, including, for example, games, file transfers, audio, and video. For such communications a proxy communications channel can be established within the Windows Live™ network as both users are available in the Windows Live™ network.

As described herein, when a user logs in to Windows Live™, an identity object is created that represents that user in the Windows Live™ network. In an embodiment, in addition to the identity object, an alias object will be created on the Windows Live™ network for each secondary social network account, such as Facebook©, to which the user's primary account on the Windows Live™ network is linked. The alias object is identified by the user's account name in Facebook© and the secondary social network name, "FACEBOOK." Both may be used to avoid an identity conflict between two networks, such as Facebook© and MySpace©, if the same account name is used for multiple networks.

The alias object may cache the basic Windows Live™ information for the user, such as the Windows Live™ id, the account capabilities, and the like. Thus, the alias object provides a look up of the user's Facebook© identity and capabilities for the identity in the Facebook©. When the alias object receives a query to get Windows Live™ details, it also notifies the Windows Live™ identity with the details, i.e., both for Windows Live™ and for Facebook©, of the identity making the query.

The query to fetch the Windows Live™ details is performed when the Windows Live™ identity object receives an initial availability notification of a contact from a Facebook© account. Initial availability notifications are notifications that arrive within a short period, for example, within less than about one minute, after Windows Live™ logs the user in to Facebook©. To prevent multiple look ups, and potentially redundant mapping, the calls may be limited to a small period after the login to Facebook© and are not done for every availability notification received.

If the look up succeeds, i.e., if a query response is received by a user's Windows Live™ account from another user's Windows Live™ account providing the alias information about the other user's Facebook© account, then the module associated with the user's account on Windows Live™ will perform several functions. First, the module will cache the friend's Windows Live™ and Facebook© details, along with the primary identity of the user so that duplicate look ups are not performed. Since the look up succeeded, the friend is connected to Facebook© via Windows Live™. Further, the module associated with the friends account on Windows Live™ would have noted the user's Windows Live™ and Facebook© details from the query. In this way the friend's identity in Windows Live™ can update its cache with the user's Windows Live™ and Facebook© details.

The techniques described herein provide a scalable approach to build up the Windows Live™ users memory cache having details of the friends available for communication in Facebook©. Once the mapping of friend's Facebook© identity to the friend's Windows Live™ identity is available, a dynamic communication channel can be established within Windows Live™, without communicating through Facebook©.

Figure 4:
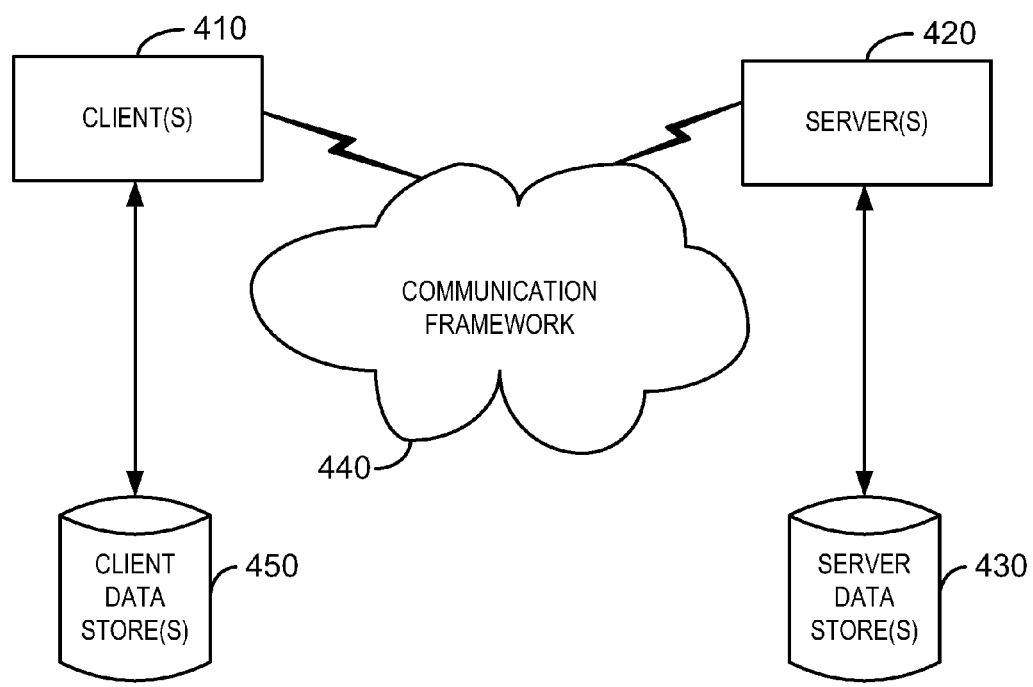
FIG. 4 is a block diagram of an exemplary networking environment wherein aspects of the claimed subject matter can be employed.
Figure 5:
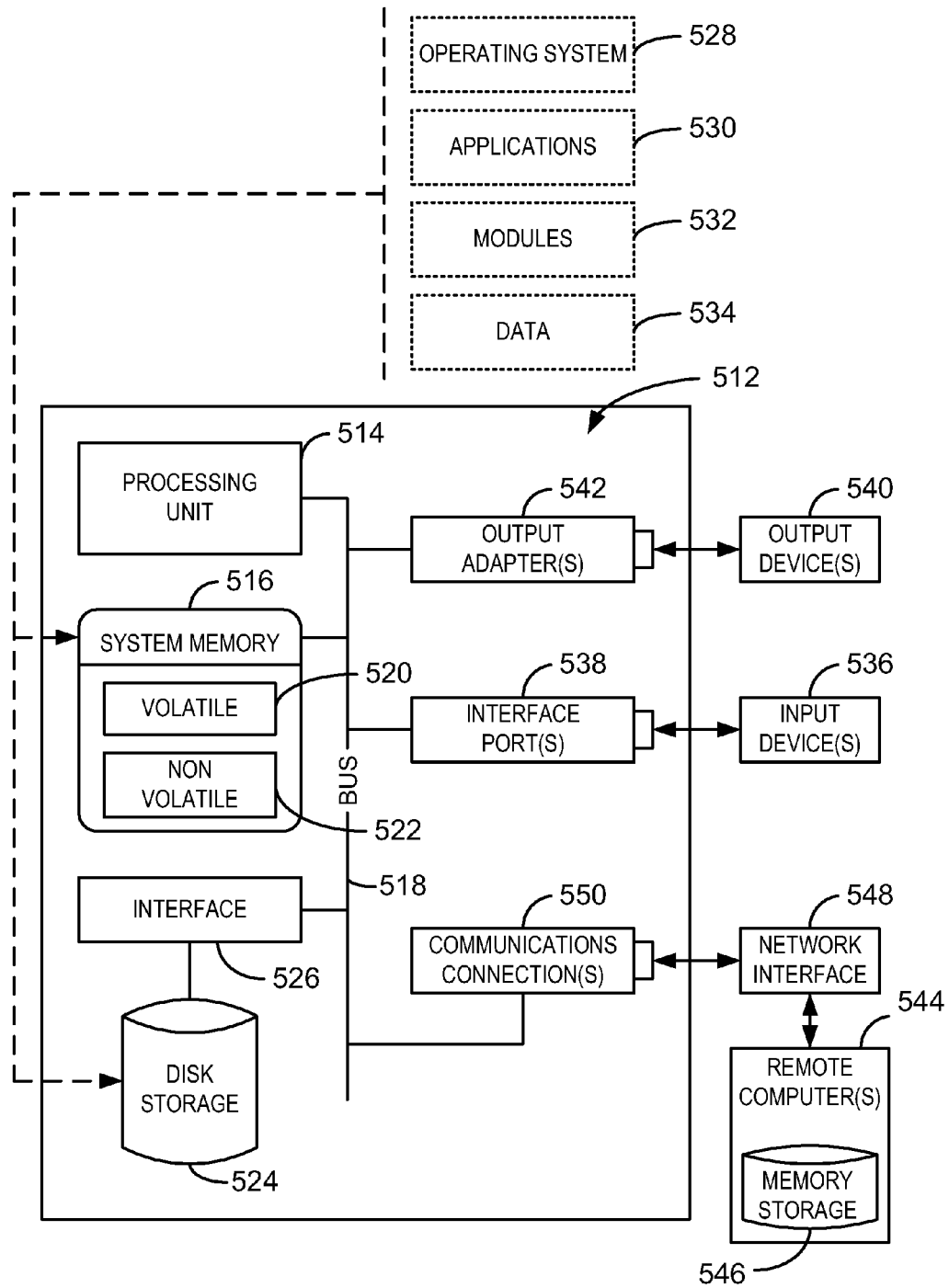
FIG. 5 is a block diagram of an exemplary operating environment that can be employed in accordance with the claimed subject matter.

In order to provide additional context for implementing various aspects of the claimed subject matter, FIGS. 4 and 5 and the following discussion are intended to provide a brief, general description of a suitable computing environment in which the various aspects of the subject innovation may be implemented. For example, proxy communications between two users through two social networking sites can be implemented in such a suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the subject innovation may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some aspects of the subject innovation may be practiced on stand-alone computers. In a distributed computing environment, program modules may be located in local and/or remote memory storage devices.

FIG. 4 is a schematic block diagram of a sample-computing system 400 with which proxy communications may be implemented. The system 400 includes one or more client(s) 410. The client(s) 410 can be hardware and/or software (e.g., threads, processes, computing devices). For example, the clients may be modules located in a primary social network that create aliases for identities on secondary social networks and cache the relationships between other user's identities on the primary social network and their identities on secondary social networks. The system 400 also includes one or more server(s) 420. The server(s) 420 can be hardware and/or software (e.g., threads, processes, computing devices).

One possible communication between a client 410 and a server 420 can be in the form of a data packet adapted to be transmitted between two or more computer processes. The system 400 includes a communication framework 440 that can be employed to facilitate communications between the client(s) 410 and the server(s) 420. The client(s) 410 are operably connected to one or more client data store(s) 450 that can be employed to store information local to the client(s) 410. Information in the data store(s) 450 may include, for example, aliases associated with accounts and a cache of maps. The client data store(s) 450 are not limited to the client(s) 410, but may be located remotely, such as in a cloud server. Similarly, the server(s) 420 are operably connected to one or more server data store(s) 430 that can be employed to store information local to the servers 420.

As an example, the client(s) 410 may be modules in user accounts in a primary social network that provide access to a secondary social network over a communication framework 440 hosted by the Internet. The client(s) may also include local user computers that can provide access to the primary social network over the communication framework 440. The server(s) 420 may be secondary social networks accessed by the client(s), which may send presence notifications and forward queries and messages, as explained herein.

With reference to FIG. 5, an exemplary environment 500 for implementing various aspects of the claimed subject matter includes a computer 512. The computer 512 includes a processing unit 514, a system memory 516, and a system bus 518. The system bus 518 couples system components including, but not limited to, the system memory 516 to the processing unit 514. The processing unit 514 can be any of various available processors. Dual microprocessors and other multiprocessor architectures also can be employed as the processing unit 514.

The system bus 518 can be any of several types of bus structure(s) including the memory bus or memory controller, a peripheral bus or external bus, and/or a local bus using any variety of available bus architectures known to those of ordinary skill in the art.

The system memory 516 may include non-transitory computer-readable storage media comprising volatile memory 520 and nonvolatile memory 522. The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable programmable ROM (EEPROM), or flash memory.

Volatile memory 520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 512 also includes other non-transitory computer-readable media, such as removable/non-removable, volatile/non-volatile computer storage media. FIG. 5 shows, for example a disk storage 524. Disk storage 524 includes, but is not limited to, devices like a magnetic disk drive, floppy disk drive, tape drive, Jaz drive, Zip drive, LS-100 drive, flash memory card, or memory stick.

In addition, disk storage 524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 524 to the system bus 518, a removable or non-removable interface is typically used such as interface 526.

It is to be appreciated that FIG. 5 describes software that acts as an intermediary between users and the basic computer resources described in the suitable operating environment 500. Such software includes an operating system 528. Operating system 528, which can be stored on disk storage 524, acts to control and allocate resources of the computer system 512.

System applications 530 take advantage of the management of resources by operating system 528 through program modules 532 and program data 534 stored either in system memory 516 or on disk storage 524. It is to be appreciated that the computing environment may include a server in a primary social network, and the system memory 516 or disk storage 524 may hold modules that create aliases and caches of maps, as well as the aliases and caches themselves. In some embodiments, a web interface may be provided to a user over the Internet through a program module 532.

In some embodiments, the computer 512 can represent a user computer used to access the social network. In these embodiments, a user enters commands or information into the computer 512 through input device(s) 536. Input devices 536 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 536 connect to the processing unit 514 through the system bus 518 via interface port(s) 538. Interface port(s) 538 include, for example, a serial port, a parallel port, a game port, and a universal serial bus (USB).

Output device(s) 540 use some of the same type of ports as input device(s) 536. Thus, for example, a USB port may be used to provide input to the computer 512 and to output information from computer 512 to an output device 540. Information rendered by the subject innovation may appear on an output device 540.

Output adapter 542 is provided to illustrate that there are some output devices 540 like monitors, speakers, and printers, among other output devices 540, which are accessible via adapters. The output adapters 542 include, by way of illustration and not limitation, video and sound cards that provide a means of connection between the output device 540 and the system bus 518. It can be noted that other devices and/or systems of devices provide both input and output capabilities such as remote computer(s) 544.

The computer 512 can be a server hosting a social network website in a networked environment using logical connections to one or more remote computers, such as remote computer(s) 544. The remote computer(s) 544 may be client systems configured with web browsers, PC applications, mobile phone applications, and the like, to allow users to browse the Internet, as discussed herein. The remote computer(s) 544 can be a personal computer, a server, a router, a network PC, a workstation, a microprocessor based appliance, a mobile phone, a peer device or other common network node and the like, and typically includes many or all of the elements described relative to the computer 512. For purposes of brevity, only a memory storage device 546 is illustrated with remote computer(s) 544. Remote computer(s) 544 is logically connected to the computer 512 through a network interface 548 and then physically connected via a communication connection 550.

Network interface 548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 550 refers to the hardware/software employed to connect the network interface 548 to the bus 518. While communication connection 550 is shown for illustrative clarity inside computer 512, it can also be external to the computer 512. The hardware/software for connection to the network interface 548 may include, for exemplary purposes only, internal and external technologies such as, mobile phone switches, modems including regular telephone grade modems, cable modems and DSL modems, ISDN adapters, and Ethernet cards.

An exemplary embodiment of the computer 512 may comprise a server computer in a social network with a web server. An exemplary processing unit 514 for the client may be a computing cluster comprising Intel® Xeon CPUs. The disk storage 524 may comprise an enterprise data storage system, for example, holding thousands of user pages.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as wholly in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method of establishing proxy communications between users on a social network, comprising:
   creating an alias on a primary social network when a user logs in to the primary social network, wherein the alias comprises the user's identity on a secondary social network, and wherein the user is associated with:
      a user's account on the primary social network; and
      a user's account on the secondary social network;
   creating a cache comprising a map relating a second user's identity on the primary social network to the second user's identity on a secondary social network, wherein the creation of the map is based, at least in part, on the user and the second user being identified as friends in the secondary social network, and wherein the second user is associated with:
      a second user's account on the primary social network; and
      a second user's account on the secondary social network; and
   directing communications from the user to the second user through the primary social network based, at least in part, on the map, wherein the communications appear to have been sent from the user's account on the secondary social network.

2. The method of claim 1, comprising:
   creating a separate alias for the second user on the primary social network, wherein the separate alias is created when the second user logs in to the primary social network, and wherein the alias comprises the second user's identity on the secondary social network;
   creating a separate cache comprising a second map relating the user's identity on the primary social network to the user's identity on the secondary social network; and
   directing communications from the second user to the user through the primary social network based, at least in part, on the map, wherein the communications appear to have been sent from the second user's account on the secondary social network.

3. The method of claim 1, comprising, upon receiving an initial notification from the secondary social network that the user is present: querying within the primary social network account to determine if the user has an account on the primary social network that corresponds to an account in the secondary social network; and, if so:
   recording the relationship between the second user's primary social network identity and the second user's secondary social network identity as a map stored in the cache;
   sending a return message to the second user's primary social network account with the user's primary social network identity;
   receiving the return message in the second user's primary social network account; and
   recording the relationship between the user's primary network identity and the user's secondary network identity as a map stored in the separate cache.

4. The method of claim 1, comprising sending a complex communication from the user to the second user, wherein upon submission of the complex communication, the user's primary social network account determines from the cache if the second user is also on the primary social network, and if so:
   determines the second user's identity on the primary social network from the map stored in the cache; and
   sends the complex communication through the primary social network, with a return address that corresponds to the user's secondary social network account.

5. The method of claim 4, comprising, if the second user is not also on the primary social network, returning an error message indicating that the complex communication is not supported between social networking sites.

6. The method of claim 4, wherein the complex communication is a video file, an audio file, a picture message, or any combinations thereof.

7. The method of claim 1, comprising ignoring presence notifications received after an initial presence notification is received.

8. A system for establishing proxy communications between users on a primary social network, the system comprising:
   a processing unit in the primary social network; and
   a system memory, wherein the system memory comprises code configured to direct the processing unit to:
      create an alias for a user on a primary social network when the user logs in to the primary social network, and wherein the alias comprises the user's identity on a secondary social network, and wherein the user is associated with:

a user's account on the primary social network; and
a user's account on the secondary social network;
create a cache configured to hold maps that relate each of a plurality of other users' identities on the primary social network to the other users' identities on a secondary social network, wherein the plurality of other users are friends of the user in the secondary social network, and wherein the second user is associated with:
a second user's account on the primary social network; and
a second user's account on the secondary social network; and
directing communications between the user and the other users through the primary social network based, at least in part, on the maps, wherein the communications are configured to appear to have been sent from the secondary social network.

9. The system recited in claim 8, comprising code configured to direct the processing unit to:
create a separate alias for a second user on the primary social network, wherein the separate alias is created when the second user logs in to the primary social network, and wherein the alias comprises the second user's identity on the secondary social network;
create a separate cache comprising a map relating the user's identity on the primary social network to the user's identity on the secondary social network; and
direct communications from the second user to the user through the primary social network based, at least in part, on the map, wherein the communications appear to have been sent from the second user's account on the secondary social network.

10. The system recited in claim 8, comprising code configured to direct the processor to query within the primary social network to determine if the user has an account on the primary social network; and, if so:
record the relationship between the second user's primary social network identity and the second user's secondary social network identity as a map stored in the cache;
send a return message to the second user's primary social network account with the user's primary social network identity;
receive the return message in the second user's primary social network account; and
record the relationship between the user's primary social network identity and the user's secondary social network identity as a map stored in the separate cache.

11. The system recited in claim 8, comprising a social networking website.

12. The system recited in claim 8, comprising code configured to log in a user of the primary social network to an account on the secondary social network.

13. The system recited in claim 12, comprising code configured to intercept and respond to messages from a secondary social network that include queries from another account on the primary social network, wherein the queries are requesting information about the alias.

14. The system recited in claim 8, comprising code configured to:
intercept a message sent from the user's account on the primary social network to a second user's account on the secondary social network based, at least in part, on a map stored in a cache, wherein the map correlates the second user's identities on the primary and secondary social networks;
modify the message to make it appear that it came from the user's account on the secondary social network; and
transmit the message to the second user's account on the primary social network.

15. One or more computer-readable storage devices, comprising code configured to direct a processing unit to:
create an alias on a primary social network when a user logs in to the primary social network, and wherein the alias comprises the user's identity on a secondary social network, and wherein the user is associated with:
a user's account on the primary social network; and
a user's account on the secondary social network;
create a cache comprising a map relating a second user's identity on the primary social network to the second user's identity on a secondary social network, wherein the creation of the map is based, at least in part, on the user and the second user being identified as friends in the secondary social network, and wherein the second user is associated with:
a second user's account on the primary social network; and
a second user's account on the secondary social network; and
direct communications from the user to the second user through the primary social network based, at least in part, on the map, wherein the communications appear to have been sent from the user's account on the secondary social network.

16. The one or more computer-readable storage devices recited in claim 15, comprising code configured to:
create a separate alias for a second user on the primary social network, wherein the separate alias is created when the second user logs in to the primary social network, and wherein the alias comprises the second user's identity on the secondary social network;
create a separate cache comprising a map relating the user's identity on the primary social network to the user's identity on the secondary social network; and
direct communications from the second user to the user through the primary social network based, at least in part, on the map, wherein the communications appear to have been sent from the second user's account on the secondary social network.

17. The one or more computer-readable storage devices recited in claim 15, comprising code configured to query within the primary social network to determine if the user has an account on the primary social network; and, if so:
receive the query in the user's primary social network account;
record the relationship between the second user's primary social network identity and the second user's secondary social network identity as a map stored in the cache;
send a return message to the second user's primary social network account with the user's primary social network identity;
receive the return message in the second user's primary social network account; and
record the relationship between the user's primary social network identity and the user's secondary social network identity as a map stored in the separate cache.

18. The one or more computer-readable storage devices recited in claim 15, comprising code configured to:
intercept a message sent from the user's account located on the primary social network to a second user's account located on the secondary social network based, at least in part, on a map stored in a cache, wherein the map correlates the second user's identity on the primary social network to the second user's identity on the secondary social network;

modify the message to make it appear that it came from the user's account on the secondary social network; and transmit the message to the second user's account on the primary social network.

19. The one or more computer-readable storage devices recited in claim 15, comprising code configured to send a complex communication from the user to the second user, wherein upon submission of the complex communication, the user's primary social network account determines from the cache if the second user is also on the primary social network, and if so:

determine the second user's identity on the primary social network from the map stored in the cache; and send the complex communication through the primary social network, with a return address that corresponds to the user's secondary social network account.

20. The one or more computer-readable storage devices recited in claim 19, wherein the complex communication is a video file, an audio file, a picture message, or any combinations thereof.

* * * * *